3,140,192
CARBON BLACK PROCESS AND PRODUCT

Merrill E. Jordan and Harvey M. Cole, Walpole, William G. Burbine, Whitman, and David L. Petterson, Wollaston, Mass., assignors to Cabot Corporation, Boston, Mass., a corporation of Delaware
No Drawing. Filed Oct. 31, 1960, Ser. No. 65,956
11 Claims. (Cl. 106—307)

This invention relates to the production of carbon black and in particular to an improved method of producing desirable carbon black products.

Commercially carbon black is produced by the thermal decomposition of carbon containing materials which are essentially hydrocarbon in nature. The thermal decomposition of the carbonaceous material can be achieved by various processes such as open flame decomposition (impingement or channel), enclosed direct flame decomposition (furnace), stored heat decomposition (cyclical thermal furnace), externally heated surfaces (continuous thermal) or detonation or internal combustion processes (engine or energy utilizing systems) etc. The basic properties of a black and therefore the performance characteristics exhibited thereby in the applications thereof are determined in large measure by the particular process by which it is produced. For example, channel blacks are generally characterized by high surface area, low structure, high volatile content and low pH, and are particularly suitable for use as coloring agents, and as reinforcing agents in rubber. A carbon black produced by the furnace process on the other hand, may be produced over a wide range of closely controlled particle sizes and accordingly is adaptable as a filler for various synthetic rubbers and plastics. Also, variations in the fuels and reaction conditions used in the above processes can influence the properties of the black produced. Such essentially is the present degree of flexibility of variables involved in the production of carbon black and these although limited, nevertheless permit the production of the many types of carbon black now being utilized in a wide and ever expanding variety of commercial applications.

Despite the fact that, by utilizing and manipulating the variables mentioned above, the properties of a produced black may be varied and reasonably predicted or controlled, there are still intrinsic variables, e.g., changes in the quality of the raw material, which render difficult the precise day to day control of the ultimate properties of the final product produced. This is especially true when a carbon black is produced for some specific application and must consistently, uniformly and within very narrow tolerances impart a certain property or set of properties to the products in which it is used. Accordingly, it would be most desirable and valuable to have simple, independent methods of controlling and adjusting the properties of the carbon black products so as to permit the uniform controlled production consistently of an ultimate desired product of predetermined properties or a product having certain properties precisely and selectively modified.

The fundamental object of the present invention is to provide a novel process for adjusting and controlling the properties of a carbon black to meet prescribed and predetermined requirements.

Another object of the present invention is to provide a novel and simple process for producing, in increased yields, a carbon black of uniform and predetermined quality.

A further object of the present invention is to provide a simple process for compensating for variables in hydrocarbon raw materials so as to avoid serious deviations in quality of the black produced.

Still another object of the present invention is to provide a process whereby a desirable carbon black may be produced which consistently and within very narrow tolerances exhibits predetermined properties.

Still other objects and advantages of the present invention will in part be obvious and will in part appear hereinafter.

We have discovered a simple yet very effective process for producing carbon blacks of such prescribed and predetermined properties which process at the same time permits the attainment of improved yields of product.

In accordance with our invention the above objects and advantages are realized by introducing into the reaction zone in which the black is being formed from the make hydrocarbon, a minor amount of one or more of the naturally occurring, electronegative elements of Group VIIa of the Mendeleev Periodic Table. Such elements are, of course, fluorine, chlorine, bromine and iodine.

The exact amount of the particular element used in accordance with the teachings of the present invention will depend upon the particular one or ones used as well as upon the nature of the particular carbon forming reaction involved and upon the degree of adjustment desired in the properties of the final carbon black product.

Although the addition of less than 500 parts by weight of the aforementioned elements per million parts by weight of make fuel may effect slight changes in the resultant black which are significant for quality control purposes, we have found that the use of such amounts evidently do not effect any significant increase in yield of carbon black nor major changes in black properties. However, above concentrations of 500 parts per million the increase in yield and the increased effect on the properties of the resulting black appear to be a function of the amount of additive utilized. We have found however, that the progressive effect of the concentration of the additive on the yield of black is confined within the range of about 1000 parts to about 100,000 parts of additive depending upon the particular process by which the black is produced. Above the range of about 100,000 parts of additive the effect of concentration thereof on yield levels off but other properties of the resulting black such as scale and oil absorption are sometimes still somewhat further affected. Also, we have found that the amount of the additive element which remains associated with the finished black is, for a given process and method of addition, largely a function of the concentration of additive utilized but is always only a small fraction of the total amount added. Accordingly, one can effectively utilize the process disclosed in this invention to produce blacks containing varying minor amounts of halogen. Such discoveries indicate that the upper limit of the amount of the particular additives utilized in accordance with the teachings of the present invention will be dictated by the ultimate properties desired in the final carbon black, e.g., ultimate structural properties and/or ultimate halogen content thereof. However, from a practical and economical viewpoint, that is, in order to avoid the use of special and costly equipment, or modification of the normal flame configuration, or modification of the combustion zone, etc. we have found that it would not be desirable to operate with an amount of additive above 200,000 parts by weight of additive per million parts by weight of make fuel. Accordingly, the extreme range of the amount of additive utilized in accordance with the teachings of this invention will cover amounts up to about 200,000 parts by weight of additive per million parts by weight of make hydrocarbons, and preferably between about 1000 parts to about 100,000 parts. Also the preferred additives of the present disclosure will be those of iodine and bromine because of their relatively greater ease of handling and because of their more pronounced influence on the resulting products when used within the aforementioned preferred range, as will be shown in the examples which appear hereinafter.

The resulting blacks obtained in accordance with the teachings of the present disclosure possess many unusual and desirable properties. For example, significant changes in particle size and arrangement such as the so called "structure" properties of the resulting black can be effected. The extent of these changes in the ultimate properties of a so produced black, as reflected by measurements of the oil absorption and nigrometer scale thereof, for example, are determined by the particular additive(s) utilized and by the concentration thereof for any particular type of process. The scale of a carbon black as determined by a nigrometer reading is an indication of the masstone or jetness of a black wherein the intensity of the jetness of blackness thereof is an inverse function of the nigrometer scale reading. Also the nigrometer scale of a black is a rapid method of determining the relative particle size of a carbon black wherein the particle size thereof generally varies directly with the scale thereof. The oil absorption of a carbon black is a measure of the oil demand of a black and therefore, a relative measure of its "structure." It is a good general indication of the relative viscosity of many ink and paint systems which utilize carbon black wherein a lower oil absorption generally implies a lower relative viscosity. Also in some rubber black systems the oil absorption of the black is a general indication of the modulus level which the black will impart to a given rubber at a given loading. Accordingly, by utilizing the teachings of our invention one may either consistently and uniformly produce from a wider variety of fuels a given quality of black or, without effecting major changes in the features of the production process, obtain from a given type of fuel a wider than normal variety of useful carbon blacks having desirable predetermined properties for applications in the fields of inks, paints, plastics, rubber etc.

In addition to the controlled production of blacks having the aforementioned predetermined properties our process may also be utilized to produce a carbon black having varying amounts of halogen contained therein. By introducing the additive to the reaction or conversion zone wherein the carbon black exists at its inception as an active radical, that is by having the additive present while the black is being created and exists in its "status nascendi," the additive has an opportunity to become more intimately admixed or associated with the final produced blacks than in post halogenation processes conducted on the finished black. Such halogenated carbon blacks may be reacted with a wide variety of compounds such as alkali metals, hydroxides, ammonias, amines, cyanides, various organic compounds, etc. in order to form carbon black derivatives by transposition. The resulting carbon black derivatives find a wide range of applications in the fields of rubber, plastics, lacquers, inks, paints, dyes, etc. Accordingly, by utilizing the teachings of this invention a carbon black may be produced which instead of being inert, is capable of reaction with other compounds to thereby produce various desirable carbon black derivatives.

Although the additives disclosed by this invention may exist in a gaseous, liquid or solid state, the addition thereof to the conversion zones of any of the aforementioned processes for the production of carbon black is easily facilitated without any radical modification of the conventional equipment utilized therein. For example, the teachings of our process are particularly adaptable to the channel process and similar processes wherein a gaseous additive (e.g., $Cl_2$), or a vaporized ordinarily non-gaseous additive (e.g., $I_2$), may be added directly to the carbon conversion zone or may be mixed with the gaseous make hydrocarbon going to said zone. In carbon black production processes wherein a non-gaseous make hydrocarbon is used the additive may be introduced to the conversion zone by itself or in admixture with the non-gaseous make fuel. Also the additives may be introduced to the combustion zone admixed with the air or other oxidizing media. The control over the amount of the additive introduced to the reaction zone either alone or admixed with the make fuel or with the oxidizing media may be readily achieved by utilizing any of the metering or regulating systems or the like known to the art.

Hereinafter, follow a number of non-limiting, illustrative examples. Unless otherwise specified, the properties of the carbon blacks listed in the examples were determined as follows:

*Nigrometer scale.*—The Nigrometer Scale of a carbon black is determined by utilizing an instrument as described in U.S. Patent 1,780,231. The instrument is used to measure the intensity of the blackness of a paste made by mixing 0.25 gram of the black being tested in 3 cc. of No. 5201 Morrill linseed varnish.

*Oil absorption.*—The Oil Absorption Procedure used is substantially the same as other such procedures used throughout the carbon black and rubber industries. It involves the Stiff Paste Oil Absorption technique in which one gram of carbon black is mixed with alkali refined linseed oil until a point is reached at which the mixture coheres in a rounded mass. This procedure is generally known as the Gardner method and results are reported in terms of pounds of oil required to wet 100 pounds of black.

*Percent bromine.*—This analysis was performed as follows: The halogen contained on the black was first oxidized by the technique described in "Organic Quantitative Microanalysis," by Niederl and Niederl, 2nd Edition, page 168. The gaseous products of the oxidation were collected in a NaOH solution which solution was subsequently analyzed for bromide according to the "Mohr" method described in "Standard Methods of Chemical Analysis," by Scott, 5th Edition, volume 1, page 272.

Example 1

Carbon black was produced by the channel process by the combustion of natural gas to which varying amounts of bromine were added. The bromine was added to the gaseous fuel at a constant rate throughout the run by dropping the liquid bromine from a microburette at a constant rate into a heated flask through which the gaseous fuel was flowing at a constant rate to thereby vaporize the bromine and admix it with the fuel. The total amount of gaseous fuel and liquid bromine utilized in the run was measured and the relation of total parts by weight of additive utilized to total parts by weight of gaseous make fuel utilized was thereby calculated. The ultimate properties of the resulting carbon blacks were determined and the following data were obtained.

| Run No. | Fuel | Channel Carbon Black Produced | | | | |
| --- | --- | --- | --- | --- | --- | --- |
| | | $Br_2$ Conc., p.p.m. (by wt. on fuel) | Yield, #/MCF gas | Scale | Oil Abs., #/# | Percent $Br_2$ by weight |
| Control | Natural Gas | None | 1.54 | 79 | 93 | 0.0 |
| C-98 | ---do--- | 7,385 | 1.54 | 78.5 | 83 | 0.8 |
| C-87 | ---do--- | 15,385 | 1.74 | 79 | 90.2 | |
| C-107 | ---do--- | 56,332 | 1.86 | 77.5 | 84 | 1.4 |
| C-109 | ---do--- | 84,375 | 1.86 | 77 | 83 | 3.04 |
| C-110 | ---do--- | 120,236 | 1.96 | 75.3 | 71 | |

It is obvious from the above table that relatively minor amounts of the additive such as about 7000 parts per million effect significant changes in the "structure" properties of the resulting channel black whereas at such low concentrations no significant increase in yield thereof is noted. It also appears from the above data that when an amount of additive greater than about 10,000 parts is utilized in the channel process then a significant increase in yield is obtained and such properties of the produced black as scale and oil absorption appear to be progressively affected as the concentration of additive is increased. The progressive effect of this particular additive on yield in this particular process, however, seems to be confined within the range of from about $10^4$ parts to $10^5$ parts thereof per million parts of make fuel.

*Example 2*

Carbon black was produced by the furnace process in an experimental furnace wherein acetylene was used as raw material. The experimental furnace was equipped with a burner composed of 3 separate concentric annular tubes the upper openings of which converge at the burner tip. Acetylene was conducted through the outer annular space to the burner tip and thence to the conversion zone while the oxidizing media (air) was conducted through the adjacent inner annular space. The inner-most of the aforementioned concentric annular spaces in the burner consists of a capillary tube through which in one run methyl alcohol alone and in another run a 1.2 molar solution of iodine in methyl alcohol was added to the conversion zone at a constant rate. The delivery of the methyl alcohol and the solution of iodine in methyl alcohol to the conversion zone was accomplished by means of a "Zero-Max" variable speed torque convertor. The percent yield of carbon black was based upon the total moles of acetylene used since methyl alcohol is generally not regarded as being capable of forming carbon black. The properties of the resulting furnace carbon blacks were measured and the following results were obtained.

| Run No. | Make Fuel Flow rate, moles/hr. | P.p.m. $I_2$ on wt. of fuel | Furnace Carbon Black Produced | | | |
|---|---|---|---|---|---|---|
| | | | Overall Yield | | Scale | Oil Abs., #/100# Black |
| | | | Lbs./lb./mole $C_2H_2$ | Percent of Total C in $C_2H_2$ | | |
| 53B | 11.2 | 9,500 | 5.0 | 15.5 | 86 | 98 |
| 47H | 11.0 | 0 | 3.3 | 12.6 | 87 | 109 |

In this particular example with $I_2$ as an additive in the furnace process it should be noted that both a significant increase in yield and a decrease in the "structure" properties of the black were obtained when only 9500 p.p.m. by weight on the make fuel of this particular additive were utilized. It should be appreciated that the properties of a resulting black produced in accordance with the teachings of the present disclosure will be determined and will vary according to the particular additive and amount thereof utilized with a particular fuel and particular process being utilized.

The furnace black of run 53B above was compounded with the conventional ingredients of a butyl rubber system as follows: The following ingredients were mixed in the following proportions in a Banbury Mixer and subsequently heat treated on a hot (300° F.) two roll mill for ten minutes.

| | Parts |
|---|---|
| Enjay Butyl 217 [1] | 100 |
| Black (53B) | 50 |
| Stearic acid | 0.5 |

[1] Enjay Butyl 217 is a copolymer of isobutylene and about 1.8% isoprene.

Subsequently, the following ingredients were compounded into the above-mentioned composition in the following proportions on a cold (50–75° F.) two roll mill.

| | Parts |
|---|---|
| Zinc oxide | 5 |
| Altax [1] | 1 |
| Tuads [2] | 1 |
| Sulfur | 2 |

[1] Altax is a trademark for benzoyl thiazyl disulfite accelerator.
[2] Tuads is a trademark for rubber vulcanizing control agents based on a mixture of tetraethylthiuram disulfite and tetramethylthiuram disulfide.

The above-mentioned composition was then cured in a press for 45 minutes at a temperature of 307° F. and the following data were obtained.

The results are compared to that of a butyl rubber compound prepared as in the manner described above but in which a commercial (SAF grade) furnace black (namely Vulcan 9) was substituted for the aforementioned black from run #53B. It should be mentioned that SAF blacks are now generally used commercially in butyl rubber tires.

| Black | Room Temp. Tensile Strength (p.s.i.) | Torsional Hysteresis | Angle Abrasion Vol. Index (cc./-rev) |
|---|---|---|---|
| 53B | 3,020 | 0.326 | 218 |
| Vulcan 9 | 2,850 | 0.566 | 349 |

The above data is offered as an illustration of a few of the desirable commercial properties of the carbon blacks which may be produced in accordance with the teachings of the present disclosure. The above example shows that when the black produced with an iodine additive in the experimental furnace (53B) is utilized in a black filled butyl rubber system, the torsional hysteresis of the system is substantially lower than the corresponding system which utilizes the commercial carbon black which is customarily used in such systems. The torsional hysteresis of a rubber system is a measurement of the recovery properties thereof wherein a lower hysteresis indicates improved recovery. Also the above data shows that the Angle Abrasion Volume Index of the butyl system in which the black from run 53B was used is substantially improved. The Angle Abrasion Volume Index is a measure of the resistance of the rubber system to abrasion and the lower the value thereof the greater the resistance to abrasion. Accordingly, the above example illustrates that by utilizing the teachings disclosed in the present specifications one may selectively alter the ultimate properties of a black to conform to predetermined specifications and thereby consistently obtain desirable carbon blacks having improved commercial properties.

*Example 3*

Substantially the same procedure as in Example 2 was followed except that chlorine gas was added continuously through the inner capillary of the burner tip to the carbon conversion zone. The yield of the resulting carbon black was determined and the following property data were obtained.

| Run No. | Fuel | P.p.m. $Cl_2$ on wt. of fuel | Furnace Carbon Black Produced | | |
|---|---|---|---|---|---|
| | | | Overall Yield (lbs./lb. mole) $C_2H_2$ | Scale | Oil Abs., # oil/ 100# blk. |
| Control | $C_2H_2$ | None | 3.3 | 87 | 109 |
| L-281 | $C_2H_2$ | 140,000 | 4.2 | 84 | 97 |

Substantially the same results as illustrated in the above example are obtained when fluorine is used in place of chlorine.

The above example shows that a considerably larger amount of chlorine or fluorine is required in the furnace process to effect significant changes in the resulting black than was necessary, for example, in Example 2 where iodine was the additive. These examples, therefore, illustrate that the additives embraced within the present disclosure are not full equivalents but rather vary considerably in effectiveness and ability to produce certain particularly desirable modified carbon blacks. Accordingly, although chlorine and fluorine are effective additives for the purposes of the present disclosure, we feel, on the basis of the above examples, that bromine and especially iodine produce the more desirable carbon blacks and also produce more striking effects in the resulting blacks when used in smaller quantities and, therefore, we strongly prefer these additives, e.g., iodine and bromine, as the preferred embodiment of the present disclosure. Also, substantially smaller amounts of the elements or combinations thereof may be utilized without departing from the scope of our invention. Smaller amounts, e.g. amounts of about 500 parts or less of additive per million parts of make fuel, may be used when the teachings of our invention are utilized to compensate for the minor uncontrollable variables inherent in the many production processes for carbon black. Also various modifications such as combustion zone design, method of introducing additive, and other modifications obvious to those well skilled in the art may be used without departing from the scope of our invention.

Having described our invention, what we claim as new and desire to secure by U.S. Letters Patent is:

1. A process for making carbon black comprising decomposing an essentially hydrocarbon raw material in a conversion zone maintained at free carbon forming conditions while simultaneously supplying to the said conversion zone per million parts by weight of said raw material amounts above about 500 up to about 200,000 parts by weight of an additive chosen from the group consisting of chlorine, iodine, bromine, fluorine and mixtures of these, said additives being supplied to said zone in the elemental form.

2. A process for making carbon black comprising decomposing an essentially hydrocarbon raw material in a conversion zone maintained at free carbon forming conditions while simultaneously supplying to the said conversion zone per million parts by weight of said raw material an amount of from about 1000 to about 100,000 parts by weight of an additive chosen from the group consisting of chlorine, iodine, bromine, fluorine and mixtures of these, said additive being supplied to said zone in the elemental form.

3. The process of claim 1 in which the said additive is iodine.

4. The process of claim 1 in which the said additive is bromine.

5. The process of claim 1 in which the said additive is chlorine.

6. The process of claim 1 in which the said additive is fluorine.

7. A composition of matter consisting essentially of carbon black and an amount of from about 100 to about 100,000 parts per million parts by weight of the carbon black of a substance chosen from the group consisting of chlorine, bromine, iodine, fluorine and mixtures of any of these, said substance being intimately associated with and uniformly distributed within the crystal structure of the said carbon black.

8. The process of claim 2 in which the said additive is iodine.

9. The process of claim 2 in which the said additive is bromine.

10. The process of claim 2 in which the said additive is chlorine.

11. The process of claim 2 in which the said additive is fluorine.

References Cited in the file of this patent

UNITED STATES PATENTS

| | | |
|---|---|---|
| 2,408,696 | Smallwood | Oct. 1, 1946 |
| 2,632,713 | Krejci | Mar. 24, 1953 |
| 3,057,687 | Mitchell | Oct. 9, 1962 |